US012403758B2

(12) United States Patent
Cho et al.

(10) Patent No.: US 12,403,758 B2
(45) Date of Patent: Sep. 2, 2025

(54) MOUNTING BUSH

(71) Applicant: DN AUTOMOTIVE CORPORATION, Gyeongsangnam-do (KR)

(72) Inventors: Seong Do Seong Cho, Busan (KR); Woo Seon Jo, Gyeongsangnam-do (KR); Jae Won Kam, Gyeongsangnam-do (KR)

(73) Assignee: DN AUTOMOTIVE CORPORATION, Gyeongsangnam-do (KR)

( * ) Notice: Subject to any disclaimer, the term of this patent is extended or adjusted under 35 U.S.C. 154(b) by 450 days.

(21) Appl. No.: 17/960,822

(22) Filed: Oct. 6, 2022

(65) Prior Publication Data
US 2024/0034142 A1   Feb. 1, 2024

(30) Foreign Application Priority Data

Jul. 27, 2022   (KR) ........................ 10-2022-0093155

(51) Int. Cl.
*B60K 5/12*      (2006.01)
*F16F 1/38*      (2006.01)

(52) U.S. Cl.
CPC ............. *B60K 5/1208* (2013.01); *F16F 1/38* (2013.01)

(58) Field of Classification Search
CPC .. F16F 13/10; F16F 13/16; F16F 13/14; F16F 1/38; B60K 5/1208
See application file for complete search history.

(56) References Cited

U.S. PATENT DOCUMENTS

| | | | | |
|---|---|---|---|---|
| 3,279,779 | A * | 10/1966 | Kloss | F16F 3/12 267/153 |
| 3,322,377 | A * | 5/1967 | Morlon | F16F 1/3935 267/153 |
| 7,506,862 | B2 * | 3/2009 | Siemer | B60G 7/02 267/293 |
| 10,570,978 | B2 * | 2/2020 | Rumpel | F16F 1/387 |
| 2002/0159660 | A1 * | 10/2002 | Tatura | F16F 1/3873 384/220 |

FOREIGN PATENT DOCUMENTS

| | | | | |
|---|---|---|---|---|
| EP | 2129931 B1 * | 4/2013 | | F16F 1/387 |
| GB | 2285845 A * | 7/1995 | | F16F 1/38 |
| KR | 1020200138399 | 12/2020 | | |

* cited by examiner

*Primary Examiner* — Robert A. Siconolfi
*Assistant Examiner* — Mahbubur Rashid
(74) *Attorney, Agent, or Firm* — JCIPRNET

(57) ABSTRACT

Proposed is a mounting bush including an inner pipe, an outer pipe, and a rubber mounted between the inner pipe and the outer pipe. The rubber includes an inner side surface formed along an outer circumferential surface of the inner pipe, an outer side surface formed along an inner circumferential surface of the outer pipe, and a bridge connecting between the inner side surface and the outer side surface. The bridge includes an X-axis bridge formed on each opposite side between the inner side surface and the outer side surface such that the X-axis bridge elastically supports against a horizontal load, and a Z-axis bridge which is formed in a direction perpendicular to the X-axis bridge and which is formed on each opposite side between the inner side surface and the outer side surface such that the Z-axis bridge elastically supports against a vertical load.

4 Claims, 5 Drawing Sheets

FIG. 5

MOUNTING BUSH

CROSS REFERENCE TO RELATED APPLICATION

The present application claims priority to Korean Patent Application No. 10-2022-0093155, filed Jul. 27, 2022, the entire contents of which are incorporated herein for all purposes by this reference.

BACKGROUND OF THE INVENTION

Field of the Invention

The present disclosure relates to a mounting bush. More particularly, the present disclosure relates to a technology about a mounting bush that is mounted on an electric compressor, the technology being capable of minimizing a bending moment of the mounting bush and being configured to secure the degree of freedom for the use of design space according to the characteristics of each direction.

Description of the Related Art

A mounting bush is mounted inside a vehicle, and has a structure for supporting an engine, a compressor, or the like.

FIG. 1 is a partial cut-away view illustrating a conventional mounting bush. Referring to FIG. 1, the conventional mounting bush includes an inner pipe 10, an outer pipe 20, and a rubber 30. Conventionally, the rubber 30 is formed in a cone shape, and has an integral structure.

At this time, since the rubber 30 is manufactured to have the integral structure, there are disadvantages that the rubber has a large bending angle and has a large strain.

In addition, since the magnitude of an external force applied to a mounting bush mounted on an engine or a compressor is different according to a direction of the external force, the mounting bush is required to be designed such that the mounting bush is capable of optimally withstanding the external force in any direction.

Document of Related Art
(Patent Document 1) KR 10-2020-0138399 A 'BUSH'

SUMMARY OF THE INVENTION

Accordingly, the present disclosure has been made keeping in mind the above problems occurring in the related art, and an objective the present disclosure is intended to propose a mounting bush which is mounted on an electric compressor and in which a bending moment thereof is minimized.

In addition, another objective of the present disclosure is intended to propose a mounting bush capable of securing the degree of freedom for the use of design space according to the characteristics of an electric compressor and to the characteristics of each direction.

Accordingly, the present disclosure has been made keeping in mind the above problems occurring in the related art, and an objective of the present disclosure is to provide a mounting bush including an inner pipe, an outer pipe, and a rubber mounted between the inner pipe and the outer pipe, wherein the rubber includes: an inner side surface formed along an outer circumferential surface of the inner pipe; an outer side surface formed along an inner circumferential surface of the outer pipe; and a bridge connecting between the inner side surface and the outer side surface, and the bridge includes: an X-axis bridge formed on each opposite side between the inner side surface and the outer side surface such that the X-axis bridge elastically supports against a horizontal load; and a Z-axis bridge which is formed in a direction perpendicular to the X-axis bridge and which is formed on each opposite side between the inner side surface and the outer side surface such that the Z-axis bridge elastically supports against a vertical load.

The rubber may be configured such that the X-axis bridge and the Z-axis bridge are respectively formed at positions spaced apart from each other in a Y-axis direction that corresponds to an axial direction of the inner pipe.

Each of the X-axis bridge and the Z-axis bridge may be formed in a curved shape, thereby having an elastic force.

The X-axis bridge may have opposite sides thereof asymmetrically formed.

The Z-axis bridge may have opposite sides thereof asymmetrically formed.

According to the technical solutions as described above, the present disclosure has the following effects.

Since the bridge of the rubber is divided into an X-axis direction, and the Y-axis direction, there is a dispersion effect in that a durable load applied in various directions is dispersed.

In addition, the present disclosure has an effect in that damage caused by a deformation of the rubber and by a bending moment of the mounting bush is small, in which the bending moment is applied in various direction from a compressor, a vehicle, and so on.

BRIEF DESCRIPTION OF THE DRAWINGS

The above and other objectives, features, and other advantages of the present disclosure will be more clearly understood from the following detailed description when taken in conjunction with the accompanying drawings, in which:

FIG. 5 is a view showing comparison of experimental results of the conventional mounting bush and the mounting bush according to an embodiment of the present disclosure.

DETAILED DESCRIPTION OF THE INVENTION

Hereinafter, an embodiment of the present disclosure will be described in detail with reference to the accompanying drawings. It is to be noted that the following description and the appended drawings are proposed to further understanding the present disclosure and the scope of the present disclosure is not limited thereto. In addition, when conventional configurations and functions may make the gist of the present disclosure unclear, a detailed description thereof will be omitted.

Figure 1:
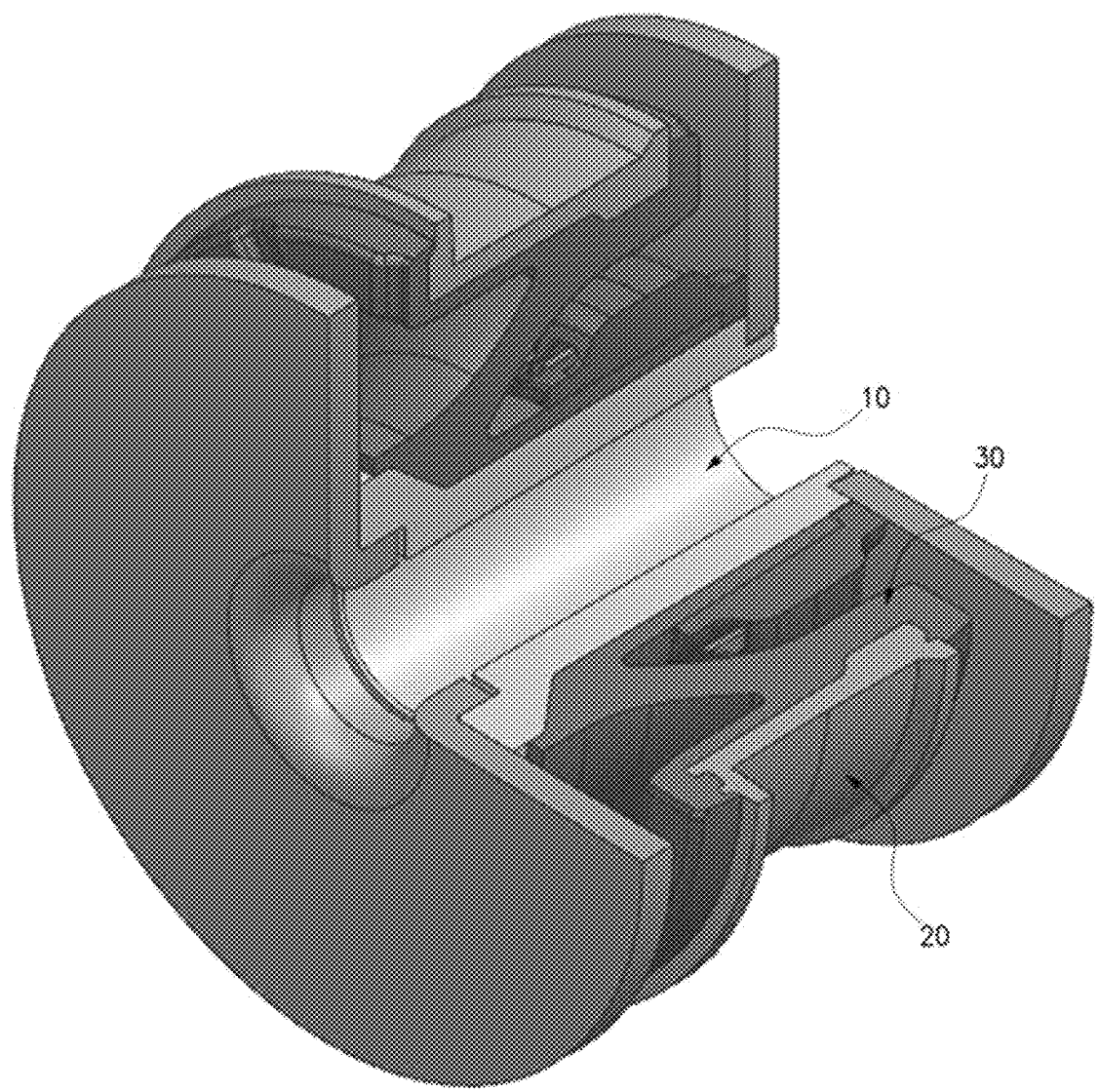
FIG. 1 is a partial cut-away view illustrating a conventional mounting bush.
Figure 2:
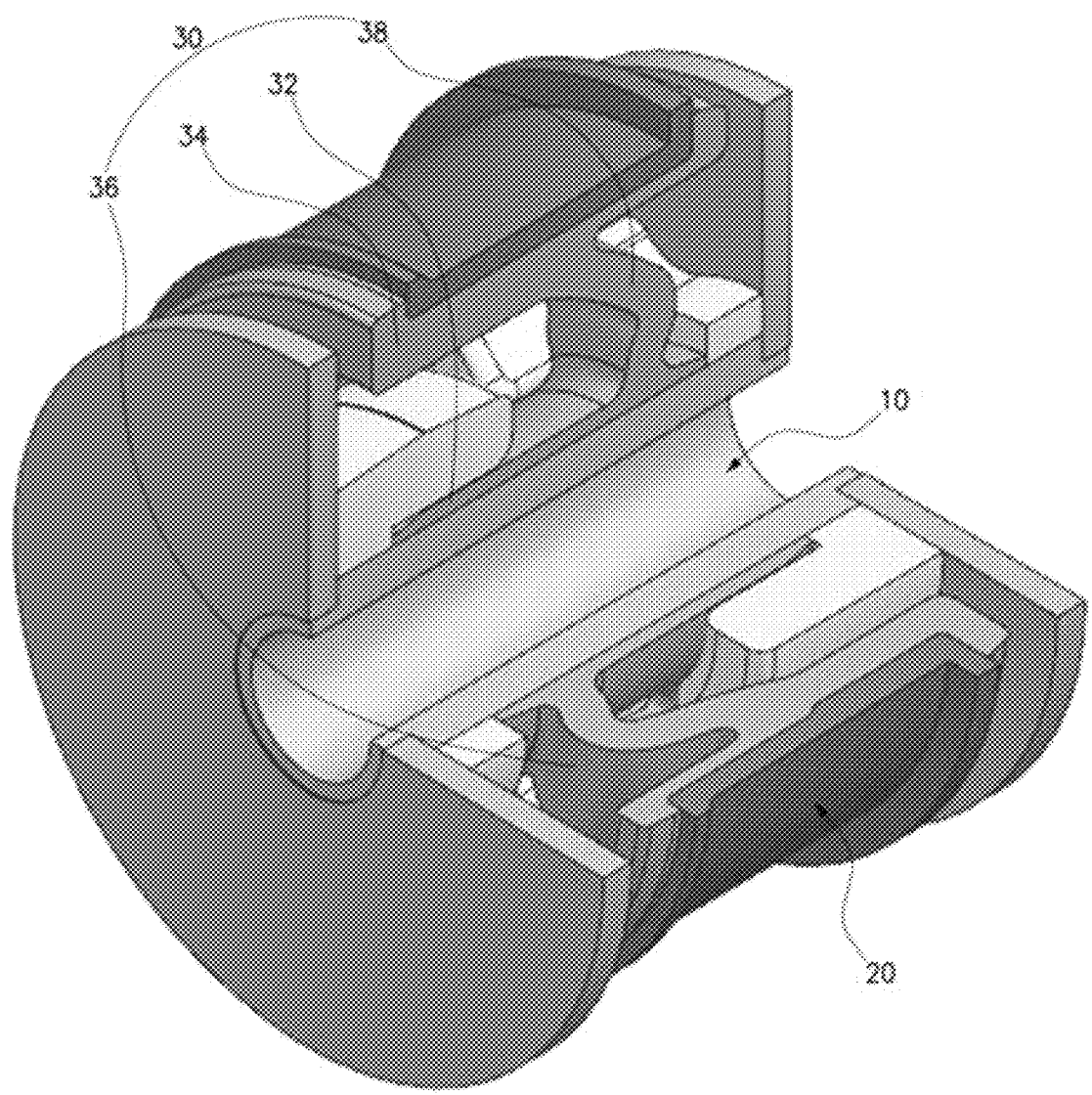
FIG. 2 is a perspective view illustrating a mounting bush according to an embodiment of the present disclosure.
Figure 3:
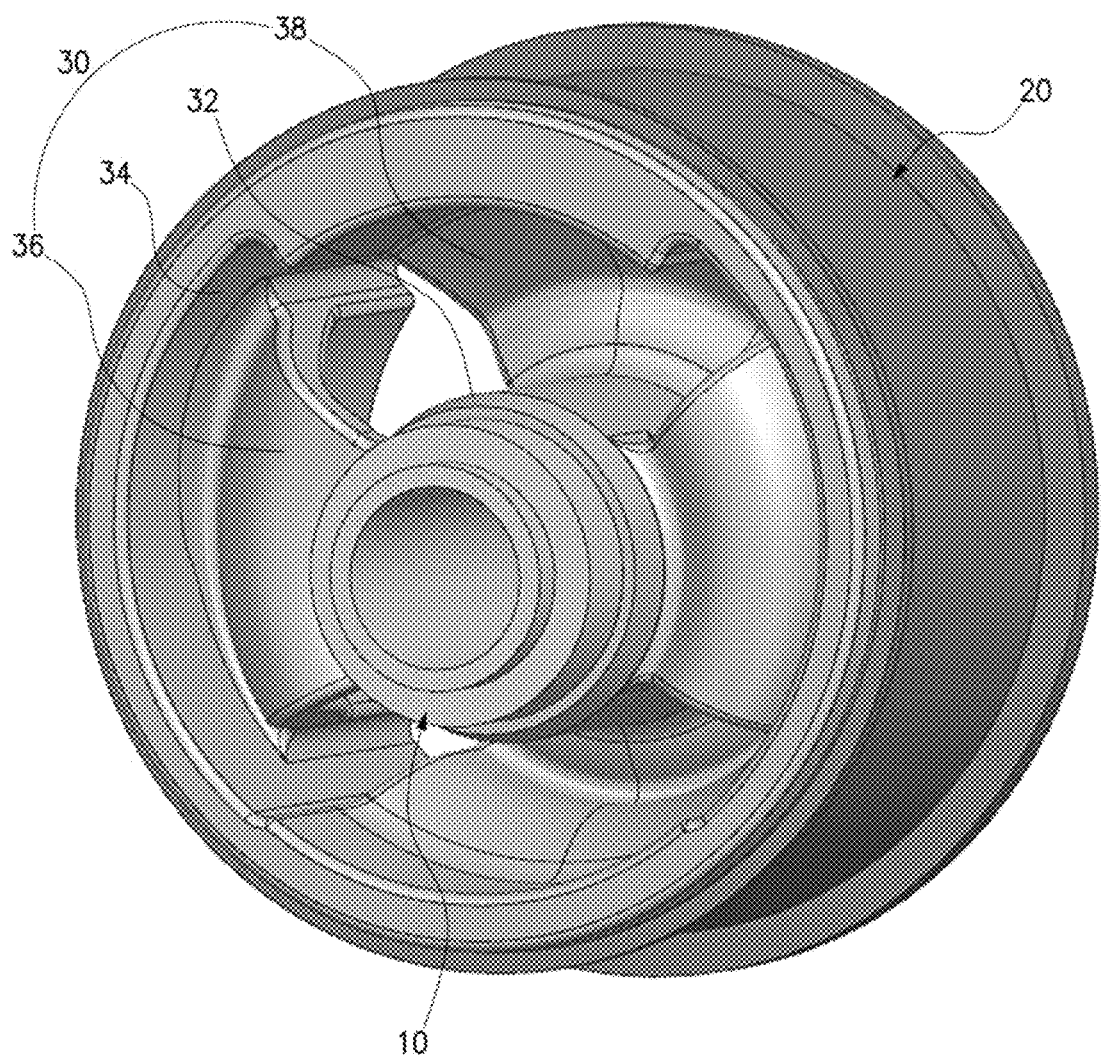
FIG. 3 is a partial cut-away view illustrating the mounting bush according to an embodiment of the present disclosure.

FIG. 2 is a perspective view illustrating a mounting bush according to an embodiment of the present disclosure, and FIG. 3 is a partial cut-away view illustrating the mounting bush according to an embodiment of the present disclosure.

Referring to FIGS. 2 and 3, a mounting bush according to the present disclosure includes an inner pipe 10, an outer pipe 20, and a rubber 30 mounted between the inner pipe 10 and the outer pipe 20. Furthermore, a main feature of the present disclosure is in the rubber 30.

In the present disclosure, the rubber 30 includes an inner side surface 32 having a pipe shape formed along an outer circumferential surface of the inner pipe 10, an outer side surface 34 having a pipe shape formed along an inner circumferential surface of the outer pipe 20, and a bridge connecting between the inner side surface 32 and the outer side surface 34.

In the present disclosure, the bridge is divided into two directions such that respective bridges in two directions correspond to load directions.

Specifically, the bridge includes an X-axis bridge 36 formed on each opposite side between the inner pipe 10 and the outer pipe 20 such that the X-axis bridge 36 elastically supports against a horizontal load, and includes a Z-axis bridge 38 which is formed in a direction perpendicular to the X-axis bridge 36 and which is formed on each opposite side between the inner pipe 10 and the outer pipe 20 such that the Z-axis bridge 38 elastically supports against a vertical load.

Figure 4A:
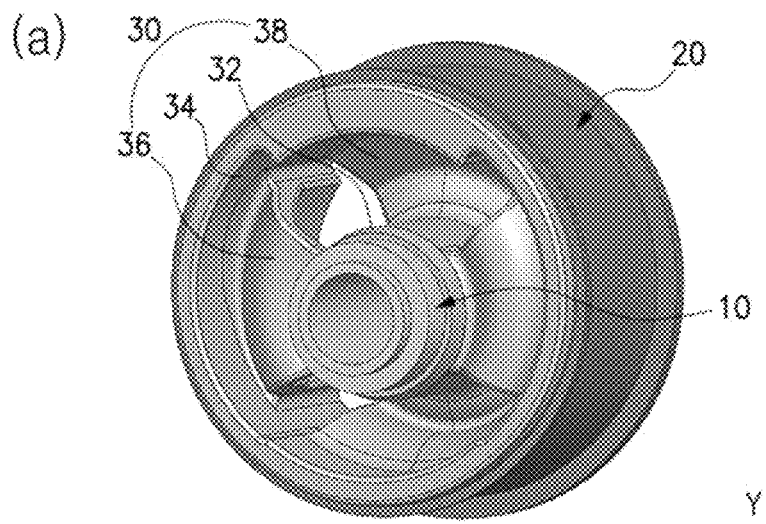
FIG. 4A is a view illustrating a direction coordinate of the mounting bush according to an embodiment of the present disclosure.
Figure 4B:
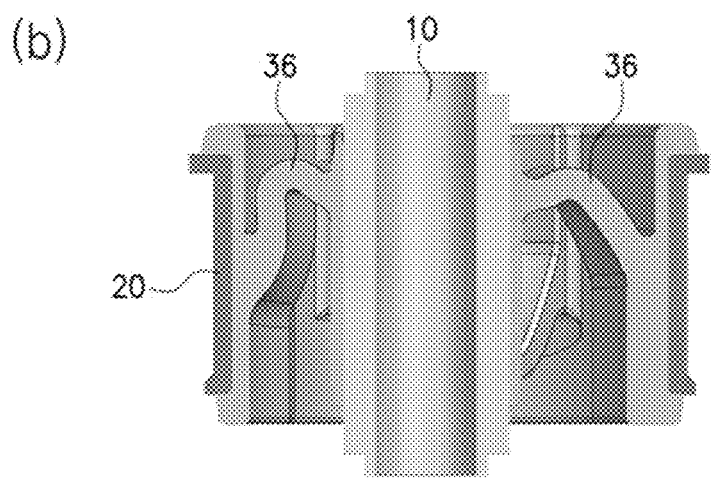
FIG. 4B is a cross-sectional view taken along in an X-direction in FIG. 4A.
Figure 4C:
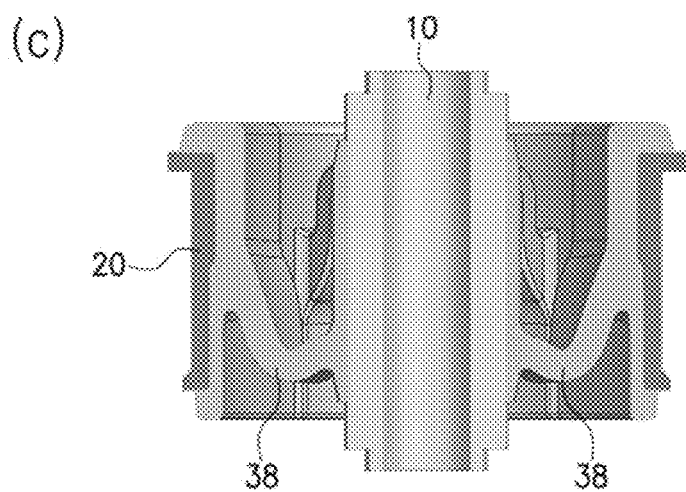
FIG. 4C is a cross-sectional view taken along in a Z-direction in FIG. 4A.

FIG. 4A is a view illustrating a direction coordinate of the mounting bush according to an embodiment of the present disclosure, FIG. 4B is a cross-sectional view taken along in an X-direction in FIG. 4A, and FIG. 4C is a cross-sectional view taken along in a Z-direction in FIG. 4A.

Referring to FIGS. 4A to 4C, in the rubber 30, the X-axis bridge 36 and the Z-axis bridge 38 are respectively formed at positions spaced apart from each other in a Y-axis direction that corresponds to an axial direction of the inner pipe 10, so that interference between the X-axis bridge 36 and the Z-axis bridge 38 may be minimized and the X-axis bridge 36 and the Z-axis bridge 38 having large cross-sectional areas may be formed.

Meanwhile, the X-axis bridge 36 and the Z-axis bridge 38 are formed in curved shapes. Therefore, the X-axis bridge 36 and the Z-axis bridge 38 are compressed when a load is applied thereto, and expand when the load is released, so that increased elasticity of each of the X-axis bridge 36 and the Z-axis bridge 38 is realized.

Therefore, since the bridge of the present disclosure is divided into an X-axis and a Y-axis so that the bridge of the present disclosure has a shape different from a conventional bridge which has a cone shape and which has an integral structure, the degree of design freedom for the X-axis that is a horizontal direction and for a Z-axis that is a vertical direction may be secured. In addition, each of the X-axis bridge 36 and the Z-axis bridge 38 may be asymmetrically designed, so that each of the X-axis bridge 36 and the Z-axis bridge 38 may be designed to have different characteristics for each direction. As such, since a high degree of spatial design freedom is realized, precise tuning of characteristics may be realized (Rigidity (Ks) of 10 N/mm or less may be realized).

Since the present disclosure is configured such that the bridge is divided into the X-axis and the Y-axis, there is a dispersion effect in that a durable load applied in various directions is dispersed, so that the present disclosure is advantageous in securing durability.

Figure 5:
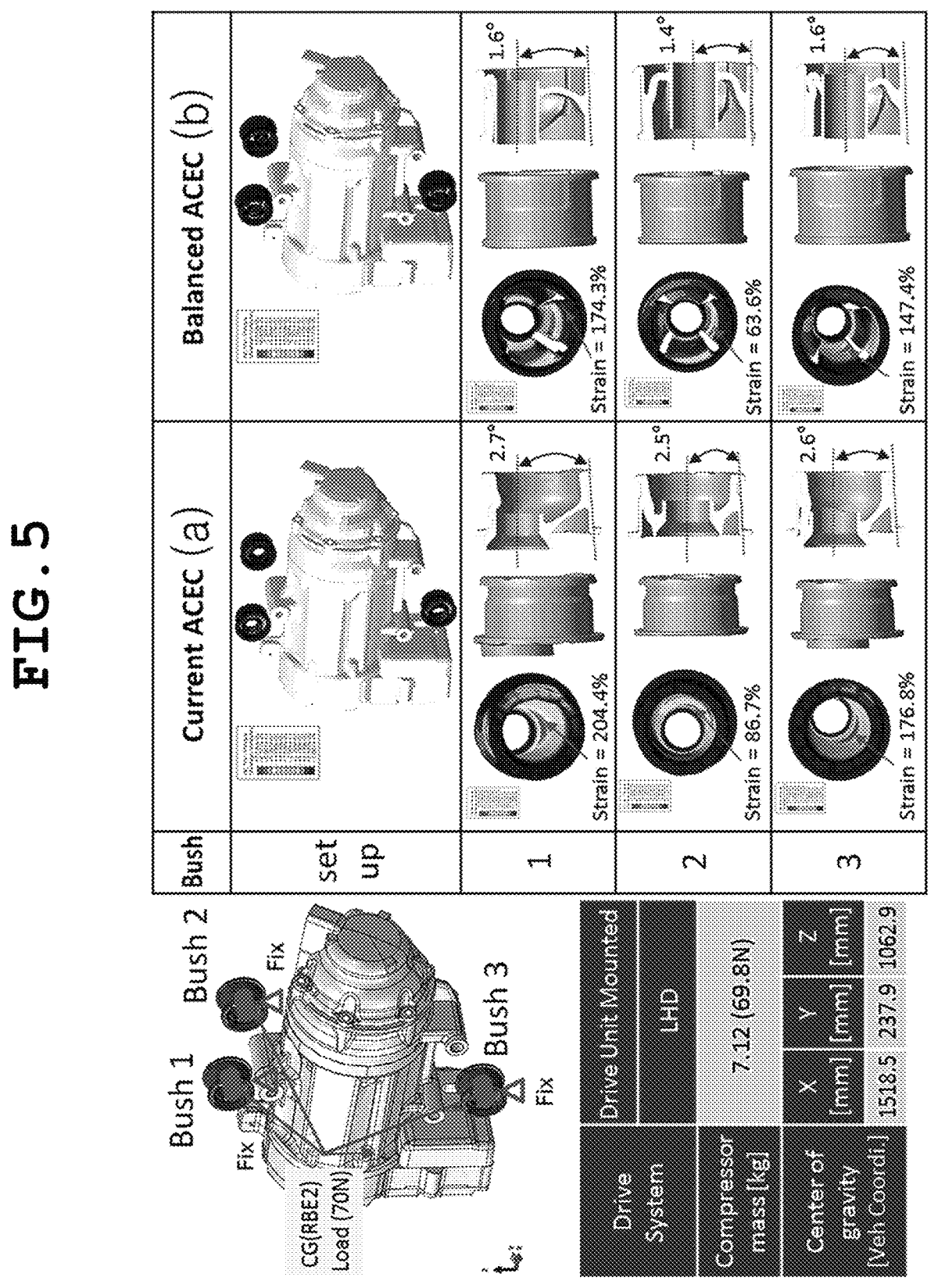

FIG. 5 is a view showing comparison of experimental results of the conventional mounting bush and the mounting bush according to an embodiment of the present disclosure.

Referring to FIG. 5, a strain with respect to a load of both the conventional mounting bush (a) and the mounting bush (b) according to an embodiment of the present disclosure that are mounted on respective electric compressors are compared.

First, under experimental conditions, the mass of the electric compressor is 7.12 kg, the weight of the electric compressor is set to 69.8 N, three mounting bushes are respectively mounted on three locations that are Bush 1, Bush 2, and Bush 3, and the three mounting bushes are compared. In addition, regarding the direction coordinates, the X-axis value, the Y-axis value, and the Z-axis value of the center of gravity were 1518.5 mm, 237.9 mm, and 1062.9 mm, respectively. The load was set to act 70 N.

In the comparison results, in the conventional mounting bush (a), the strain at the Bush 1 location is 204.4% and the bending angle is 2.7°, the strain at the Bush 2 location is 86.7% and the bending angle is 2.5°, and the strain at the Bush 3 location is 176.8% and the bending angle is 2.6°.

On the other hand, in the mounting bush (b) of the present disclosure, the strain at the Bush 1 location is 174.4% and the bending angle is 1.6°, the strain at the Bush 2 location is 63.6% and the bending angle is 1.4°, and the strain at the Bush 3 location is 147.4% and the bending angle is 1.6°.

In the comparison results, comparing to the conventional mounting bush (a), the mounting bush (b) of the present disclosure has the lower bending angle and the lower strain, so that it is confirmed that the mounting bush (b) of the present disclosure is advantageous with respect to the bending moment.

Particularly, the present disclosure has an advantage in that damage caused by a deformation of a rubber and by a bending moment of a mounting bush is small, in which the bending moment is applied in various direction from a compressor, a vehicle, and so on.

It should be understood that the basic technical concept of the present disclosure as set forth above is to provide the mounting bush, and it is apparent to those skilled in the art that various modifications are possible within the basic concept of the present disclosure.

What is claimed is:

1. A mounting bush comprising an inner pipe, an outer pipe, and a rubber mounted between the inner pipe and the outer pipe,
wherein the rubber comprises:
an inner side surface formed along an outer circumferential surface of the inner pipe;
an outer side surface formed along an inner circumferential surface of the outer pipe; and
a bridge connecting between the inner side surface and the outer side surface, and the bridge comprises:
an X-axis bridge formed on each opposite side between the inner side surface and the outer side surface such that the X-axis bridge elastically supports against a horizontal load; and
a Z-axis bridge which is formed in a direction perpendicular to the X-axis bridge and which is formed on each opposite side between the inner side surface and the outer side surface such that the Z-axis bridge elastically supports against a vertical load,
wherein the rubber is configured such that the X-axis bridge and the Z-axis bridge are respectively formed at positions spaced apart from each other in a Y-axis direction that corresponds to an axial direction of the inner pipe.

2. The mounting bush of claim 1, wherein each of the X-axis bridge and the Z-axis bridge is formed in a curved shape, thereby having an elastic force.

3. The mounting bush of claim 1, wherein the X-axis bridge has opposite sides thereof asymmetrically formed.

4. The mounting bush of claim 1, wherein the Z-axis bridge has opposite sides thereof asymmetrically formed.

\* \* \* \* \*